(12) United States Patent
Namiki et al.

(10) Patent No.: US 11,914,310 B2
(45) Date of Patent: Feb. 27, 2024

(54) IMAGE FORMING APPARATUS, COMPONENT UNIT OF THE IMAGE FORMING APPARATUS, AND PROCESSING APPARATUS FOR THE COMPONENT UNIT

(71) Applicant: CANON KABUSHIKI KAISHA, Tokyo (JP)

(72) Inventors: Takayuki Namiki, Kanagawa (JP); Naoki Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/882,704

(22) Filed: Aug. 8, 2022

(65) Prior Publication Data
US 2023/0062552 A1 Mar. 2, 2023

(30) Foreign Application Priority Data
Aug. 30, 2021 (JP) ................................. 2021-140266

(51) Int. Cl.
*G03G 21/18* (2006.01)
*G03G 15/00* (2006.01)
(Continued)

(52) U.S. Cl.
CPC ..... *G03G 15/0863* (2013.01); *G03G 15/5016* (2013.01); *G03G 21/1892* (2013.01); *G06K 15/14* (2013.01); *G06K 15/4075* (2013.01)

(58) Field of Classification Search
CPC ........... G03G 15/0863; G03G 15/0894; G03G 15/5016; G03G 21/181; G03G 21/1889;
(Continued)

(56) References Cited

U.S. PATENT DOCUMENTS 7,295,787 B2 * 11/2007 Kikuchi ............. G03G 21/1892
399/12
2005/0078969 A1 4/2005 Kikuchi
(Continued)

FOREIGN PATENT DOCUMENTS

CN 110727187 A 1/2020
EP 1 988 429 A2 5/2008
(Continued)

OTHER PUBLICATIONS

Jan. 23, 2023 Extended Search Report in European Patent Application No. 22 188 696.3.

*Primary Examiner* — Sophia S Chen
(74) *Attorney, Agent, or Firm* — Venable LLP

(57) ABSTRACT

An image forming apparatus configured to perform image formation using a component unit configured to be attachable to and detachable from a main body of the image forming apparatus is provided. The image forming apparatus includes: an access unit configured to access a storage device included in the component unit attached to the main body; and a control unit configured to control the access unit to read and update information stored in the storage device. The storage device includes a first area and a second area configured to store use information indicating a use state of the component unit, and updating of the use information stored in the first area by the control unit is configured such that updating only within a predetermined limit is permitted, and no limit is provided on updating of the use information stored in the second area.

12 Claims, 11 Drawing Sheets

| ADDRESS | DESCRIPTION OF STORED INFORMATION | INITIAL VALUE | AREA | DESCRIPTION OF AREA |
|---|---|---|---|---|
| 01h | DATE OF MANUFACTURE | DATE OF PRODUCTION | RO | UPDATING IS PROHIBITED |
| 02h | SERIAL NUMBER | INDIVIDUAL-SPECIFIC VALUE | | |
| 03h | REMAINING AMOUNT OF TONER T1 | 100% | OW | PERMIT UPDATING ONLY FOR INCREASING OR DECREASING VALUE |
| ⋮ | ⋮ | ⋮ | | |
| 14h | REMAINING AMOUNT OF TONER T2 | 100% | RW | PERMIT UPDATING TO ARBITRARY VALUE |
| ⋮ | ⋮ | ⋮ | | |
| 24h | REUSE IDENTIFICATION INFORMATION I | 0 | WO | PERMIT UPDATING TO OTHER VALUE THAN INITIAL VALUE ONLY ONCE |
| ⋮ | ⋮ | ⋮ | ⋮ | ⋮ |

(51) Int. Cl.
*G03G 15/08* (2006.01)
*G06K 15/00* (2006.01)
*G06K 15/14* (2006.01)

(58) Field of Classification Search
CPC ..... G03G 21/1892; G03G 2215/00987; G06K 15/14; G06K 15/4075
See application file for complete search history.

(56) References Cited

U.S. PATENT DOCUMENTS

| | | |
|---|---|---|
| 2005/0117918 A1 | 6/2005 | Kimura |
| 2006/0062583 A1 | 3/2006 | Kikuchi |
| 2008/0273883 A1 | 11/2008 | Kim et al. |
| 2017/0230540 A1 | 8/2017 | Sasaki |
| 2019/0092053 A1 | 3/2019 | Tanaka |
| 2020/0001636 A1 | 1/2020 | Rosenau |
| 2021/0302910 A1* | 9/2021 | Fukusada ............ G03G 15/0863 |
| 2022/0171318 A1* | 6/2022 | Kaigawa ............ G03G 21/1892 |

FOREIGN PATENT DOCUMENTS

| | | |
|---|---|---|
| EP | 3 206 152 A1 | 8/2017 |
| JP | 2004-098564 A | 4/2004 |
| JP | 2005-331539 A | 12/2005 |
| JP | 2007-248538 A | 9/2007 |
| JP | 2015-003438 A | 1/2015 |
| JP | 2015-145896 A | 8/2015 |

* cited by examiner

FIG. 4

| ADDRESS | DESCRIPTION OF STORED INFORMATION | INITIAL VALUE | AREA | DESCRIPTION OF AREA |
|---|---|---|---|---|
| 01h | DATE OF MANUFACTURE | DATE OF PRODUCTION | RO | UPDATING IS PROHIBITED |
| 02h | SERIAL NUMBER | INDIVIDUAL-SPECIFIC VALUE | | |
| 03h | REMAINING AMOUNT OF TONER T1 | 100% | OW | PERMIT UPDATING ONLY FOR INCREASING OR DECREASING VALUE |
| ... | ... | ... | | |
| 14h | REMAINING AMOUNT OF TONER T2 | 100% | RW | PERMIT UPDATING TO ARBITRARY VALUE |
| ... | ... | ... | | |
| 24h | REUSE IDENTIFICATION INFORMATION I | 0 | WO | PERMIT UPDATING TO OTHER VALUE THAN INITIAL VALUE ONLY ONCE |
| ... | ... | ... | ... | ... |

FIG. 8

| ADDRESS | DESCRIPTION OF STORED INFORMATION | INITIAL VALUE | AREA |
|---|---|---|---|
| 01h | DATE OF MANUFACTURE | DATE OF PRODUCTION | RO |
| 02h | SERIAL NUMBER | INDIVIDUAL-SPECIFIC VALUE | |
| 03h | REMAINING AMOUNT OF TONER T1 | 100% | OW |
| 04h | USED AMOUNT OF PHOTOCONDUCTOR D1 | 0% | |
| 05h | USED AMOUNT OF DEVELOPING ROLLER G1 | 0% | |
| ⋮ | ⋮ | ⋮ | |
| 14h | REMAINING AMOUNT OF TONER T2 | 100% | RW |
| 15h | USED AMOUNT OF PHOTOCONDUCTOR D2 | 0% | |
| 16h | USED AMOUNT OF DEVELOPING ROLLER G2 | 0% | |
| ⋮ | ⋮ | ⋮ | |
| 24h | REUSE COUNTER C | 0 | OW |
| 25h | REUSE IDENTIFICATION INFORMATION I1 | 0 | WO |
| 26h | REUSE IDENTIFICATION INFORMATION I2 | 0 | |
| 27h | REUSE IDENTIFICATION INFORMATION I3 | 0 | |
| ⋮ | ⋮ | ⋮ | ⋮ |

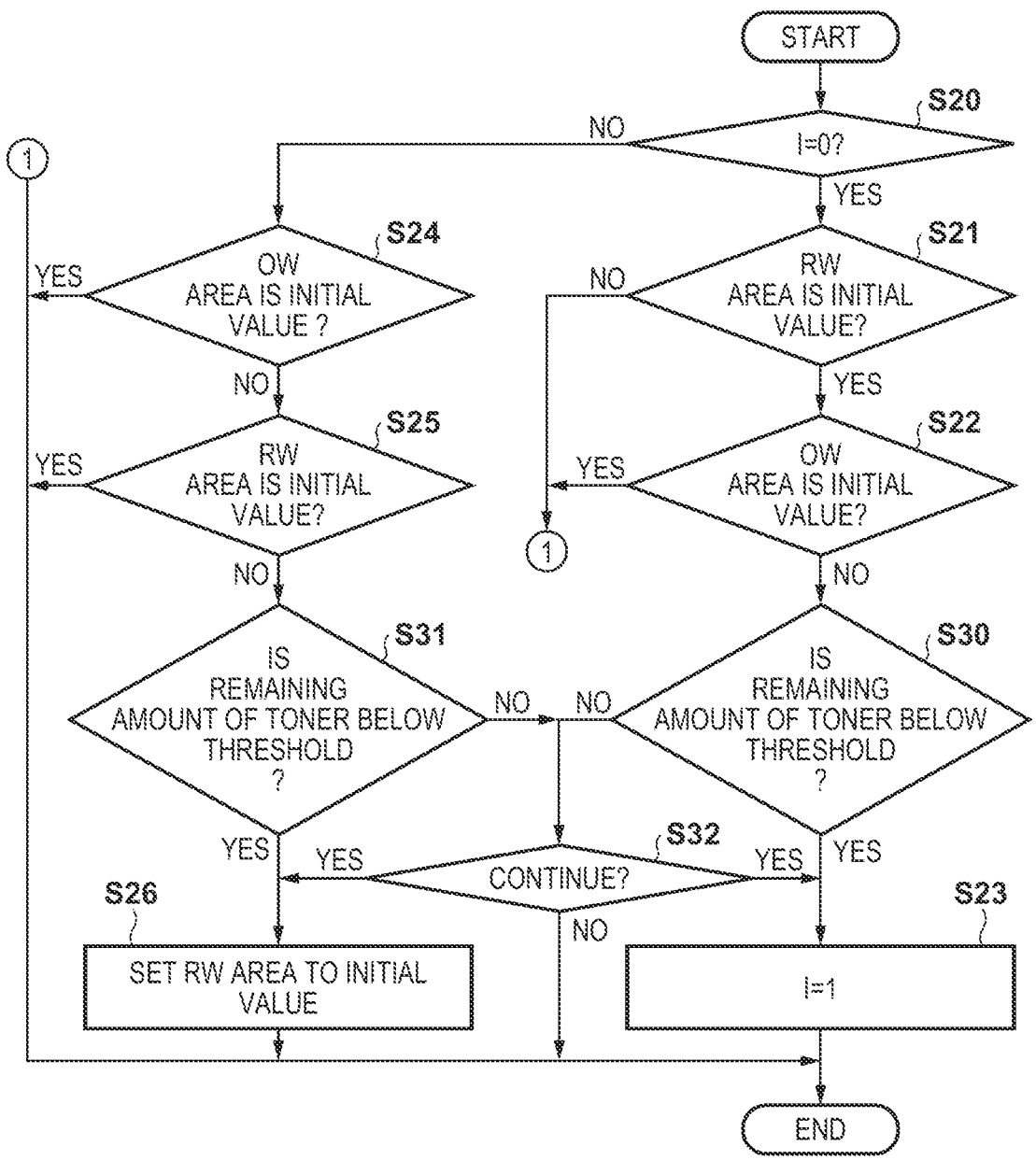

IMAGE FORMING APPARATUS, COMPONENT UNIT OF THE IMAGE FORMING APPARATUS, AND PROCESSING APPARATUS FOR THE COMPONENT UNIT

BACKGROUND OF THE INVENTION

Field of the Invention

The present disclosure relates to an image forming apparatus, and particularly relates to an image forming apparatus, in which a predetermined component unit is configured to be attachable to and detachable from the main body of the image forming apparatus, the component unit, and a processing apparatus for the component unit.

Description of the Related Art

An electrographic image forming apparatus exposes a charged photoconductor to light to form an electrostatic latent image on the photoconductor, and develops the electrostatic latent image with a developer (toner) to form an image (toner image) on the photoconductor. The image forming apparatus then forms an image on the sheet by directly transferring the image formed on the photoconductor to a sheet such as printing paper, or transferring it via an intermediate transfer body such as an intermediate transfer belt. In addition, the image forming apparatus may be configured to allow for exchange of a component unit such as a photoconductor which has shorter lifetime than the main body of the image forming apparatus. In other words, the image forming apparatus can be configured so that a predetermined component unit can be attached to and detached from the main body. Here, the component unit includes consumables such as toner, and a toner container containing toner. Furthermore, the component unit also includes a plurality of component units such as toner containers and photoconductors housed in a single housing, for example. The housing is referred to as a cartridge, for example, which may be configured to be attachable to and detachable from the main body.

In recent years, recycling of component units such as cartridges is being performed. Japanese Patent Laid-Open No. 2005-331539 discloses reusing that reuses a used cartridge by cleaning each member of the cartridge, repairing or exchanging each member of the cartridge as necessary, and further refilling toner thereto. In addition, management is performed such that a storage device is provided in the cartridge of the image forming apparatus, and information such as the remaining amount of toner or the lifetime of the photoconductor is stored in the storage device. Japanese Patent Laid-Open No. 2004-98564 discloses updating information stored in the storage device of a cartridge to be recycled.

In a case where the information stored in the storage device of the component unit is not appropriately updated when attaching the recycled component unit to the main body to start using it, the image forming apparatus acquires erroneous information about the component unit.

SUMMARY OF THE INVENTION

According to an aspect of the present disclosure, an image forming apparatus configured to perform image formation using a component unit configured to be attachable to and detachable from a main body of the image forming apparatus is provided. The image forming apparatus includes: an access unit configured to access a storage device included in the component unit attached to the main body; and a control unit configured to control the access unit to read and update information stored in the storage device. The storage device includes a first area and a second area configured to store use information indicating a use state of the component unit, and updating of the use information stored in the first area by the control unit is configured such that updating only within a predetermined limit is permitted, and no limit is provided on updating of the use information stored in the second area.

Further features of the present invention will become apparent from the following description of exemplary embodiments with reference to the attached drawings.

BRIEF DESCRIPTION OF THE DRAWINGS

FIG. 4 is an explanatory diagram of information stored in a storage device according to an embodiment;

FIG. 8 is an explanatory diagram of information stored in a storage device according to an embodiment;

FIG. 9 is a flowchart of a reset process according to an embodiment;

DESCRIPTION OF THE EMBODIMENTS

Figure 1:
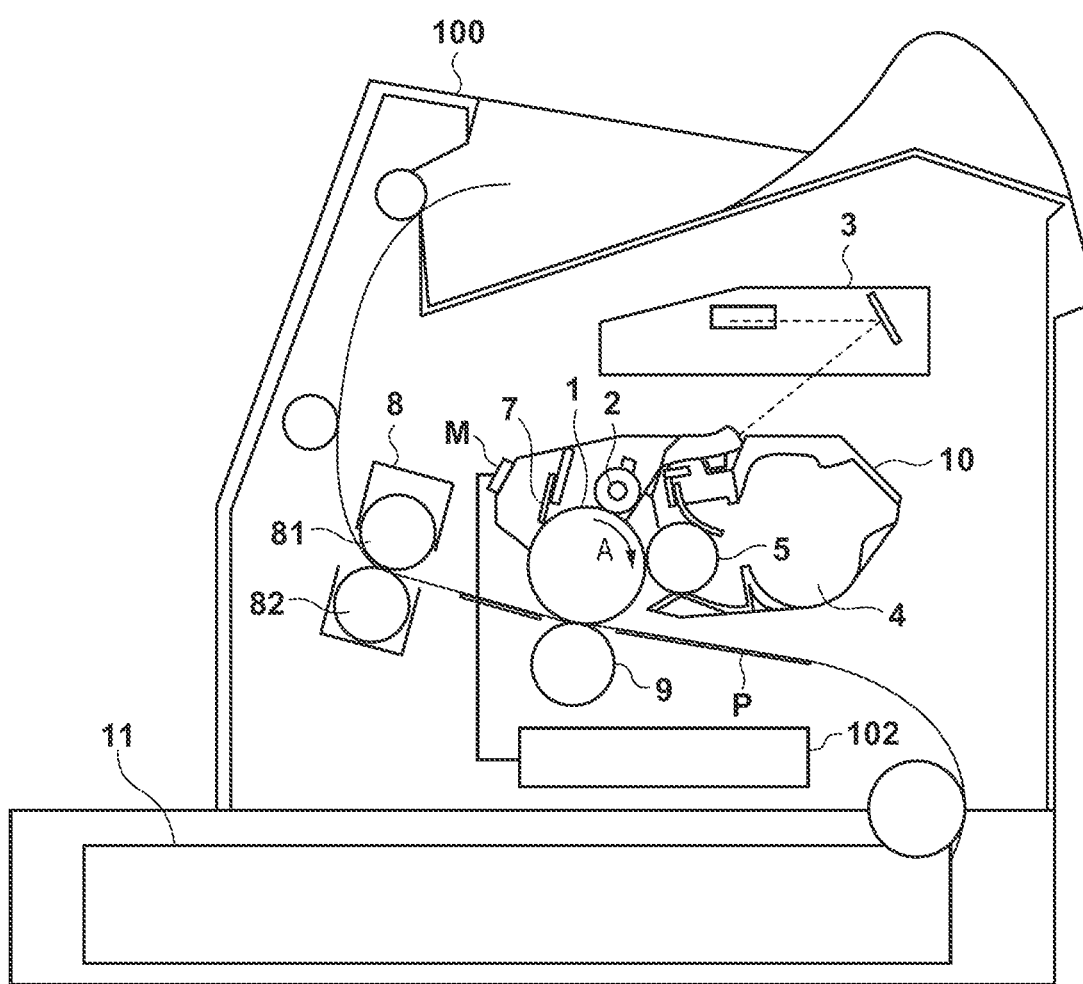
FIG. 1 is a cross sectional view of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus 100 according to the present embodiment. A photoconductor 1 is an image carrier member which is rotationally driven in a direction indicated by an arrow A when forming an image. A charging roller 2, which is a charging apparatus, charges a surface of the photoconductor 1 by outputting a charging voltage. An exposure apparatus 3 forms an electrostatic latent image on the photoconductor 1 by exposing the charged photoconductor 1, based on image data of an image to be formed. A developing roller 5, which is a developing apparatus, outputs a developing voltage to develop the electrostatic latent image on the photoconductor 1 with toner, thereby forming an image (toner image) on the photoconductor 1. Here, toner T is contained in the toner container 4 (see also FIG. 7B).

A cassette 11 contains a sheet P. The sheet P contained in the cassette 11 is conveyed to a position facing the photoconductor 1 along a conveyance path when forming the image. A transfer roller 9 outputs a transfer voltage to transfer the image on the photoconductor 1 to the sheet P. A cleaning unit 7 removes and collects, from the photoconductor 1, residual toner which has not been transferred to the sheet P and is remaining on the photoconductor 1. A fixing apparatus 8, including a heating roller 81 and a pressure roller 82, fixes the image on the sheet P by applying heat and pressure on the sheet P. After the image has been fixed, the sheet P is discharged to the outside of the image forming apparatus 100. An engine control unit 102 controls each member illustrated in FIG. 1 in order to form an image on the sheet P.

A process cartridge 10 (simply referred to as "cartridge 10" below) includes the photoconductor 1, the charging roller 2, the toner container 4, the developing roller 5, and the cleaning unit 7. The toner container 4 contains toner. The cartridge 10 is a component unit of the image forming apparatus 100, which is configured to be attachable to and detachable from the main body of the image forming apparatus 100. The cartridge 10 further includes a storage device M. The storage device M stores information of the cartridge 10 itself and information relating to parts contained in the cartridge 10 such as the photoconductor 1, toner, or the like. The information stored in the storage device M will be described below.

Figure 2:
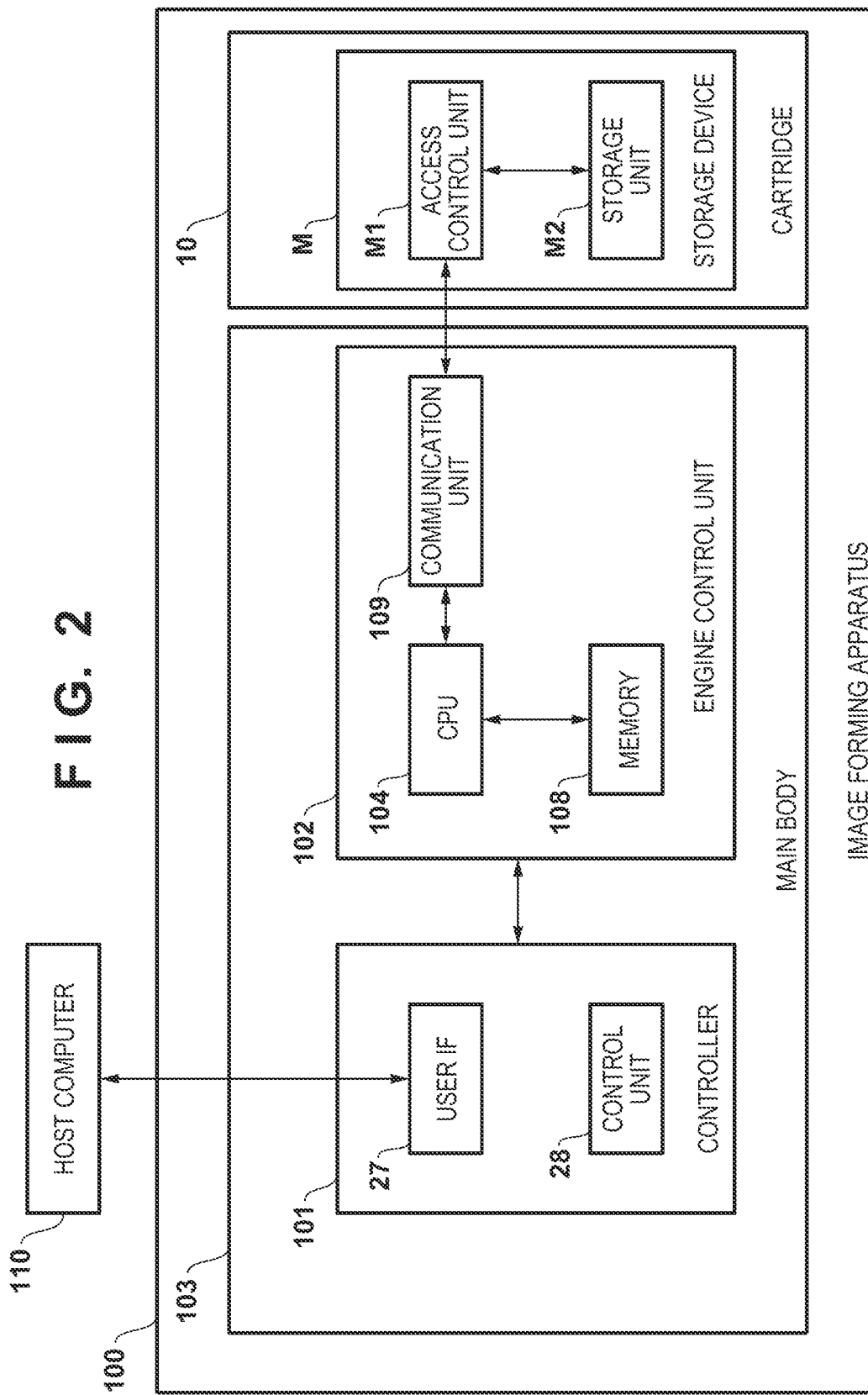
FIG. 2 is a functional block diagram of an image forming apparatus according to an embodiment.

FIG. 2 is an explanatory diagram of a control configuration of the image forming apparatus 100. Here, FIG. 2 illustrates only the parts necessary for describing the present disclosure, omitting those not necessary for describing the present disclosure. The main body 103 of the image forming apparatus 100 includes a controller 101 and an engine control unit 102. The controller 101 includes a control unit 28 including one or more processors, memories, or the like, and a user interface (IF) 27 through which the user operates the image forming apparatus 100. The control unit 28 controls the image forming apparatus 100 as a whole. The user IF 27 functions as a reception unit, i.e., an input interface configured to receive commands and setting values input to the image forming apparatus 100. Furthermore, the user IF 27 functions as a notification unit, i.e., an output interface configured to present or notify necessary information to the user.

Figure 3:
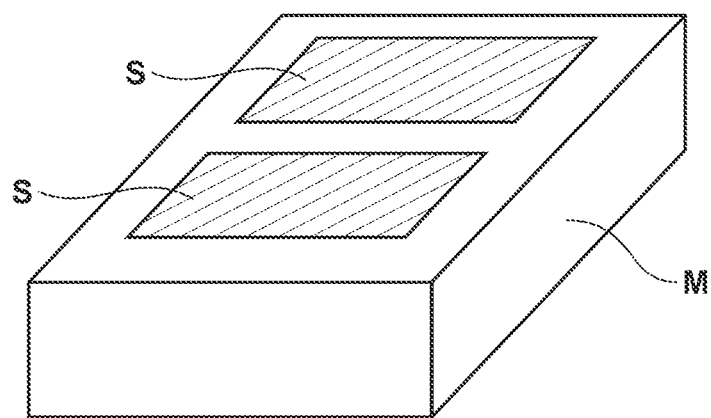
FIG. 3 is a configuration diagram of a storage device according to an embodiment.

A CPU 104 of the engine control unit 102 controls, under control by the controller 101, each member of FIG. 1 to perform image formation on the sheet P. A memory 108, including a volatile memory and a non-volatile memory, for example, stores programs to be executed by the CPU 104 and various types of data to be used by the CPU 104 for control. A communication unit 109 is configured to be communicable with an access control unit M1 of the storage device M provided on the cartridge 10 when the cartridge 10 is attached to the main body 103. For example, the communication unit 109 includes one or more external contacts. In addition, the storage device M includes external contacts, each corresponding to each external contact of the communication unit 109. FIG. 3 illustrates a case where the storage device M includes two external contacts S. When the cartridge 10 is attached to the main body 103, one or more external contacts of the communication unit 109 are electrically connected to the corresponding external contact S of the storage device M. The communication unit 109 and the access control unit M1 transmit and receive data or commands with each other via the electrical connection.

A storage unit M2 of the storage device M is an electrically rewritable, non-volatile memory which is, for example, an Electrically Erasable Programmable Read-Only Memory (EEPROM). The access control unit M1 may include, for example, a ROM storing a program, and a processor that executes the program. Based on an instruction from the communication unit 109, the access control unit M1 writes information (data) to the storage unit M2, and reads information from the storage unit M2. For example, when the communication unit 109 instructs the access control unit M1 to read data stored in a predetermined address of the storage unit M2, the access control unit M1 reads the data stored in the address of the storage unit M2 and notifies the communication unit 109. In addition, when the communication unit 109 notifies the access control unit M1 of data to be stored in a predetermined address of the storage unit M2, the access control unit M1 writes the data to the address of the storage unit M2. The communication unit 109 thus functions as an access unit that, under the control of the CPU 104, accesses the storage device M to read and update information stored in the storage device M.

Here, the control unit 28 is configured to be communicable with a host computer 110 provided outside the image forming apparatus 100 via a network. Upon receiving image data from the host computer 110 together with an image forming instruction, the control unit 28 instructs the engine control unit 102 to perform image formation based on the image data.

FIG. 4 is an explanatory diagram of a configuration of a storage area of the storage unit M2 according to the present embodiment. The storage unit M2 stores various information relating to the cartridge 10. In the present embodiment, information stored in the cartridge 10 is classified into four attributes. The storage area of the storage unit M2 is then divided into four areas, namely a Read Only (RO) area, an One Way (OW) area, a Read Write (RW) area, and a Write Once (WO) area, each corresponding to each attribute. The RO area is an area in which updating of data (information) is prohibited. The OW area is an area in which updating is permitted only for either increasing or reducing a value. The RW area is an area in which updating to an arbitrary value is permitted. The WO area is an area in which data can be updated only once. The storage device M is thus configured so that updating of information stored in the OW area and the WO area is permitted within a predetermined limit. In addition, the storage device M is configured to prohibit updating of information stored in the RO area. In contrast, the storage device M is configured to permit updating the information of the RW area to an arbitrary value, without providing any limit.

Here, limit on updating data in each area is realized by the access control unit M1. In other words, the processor of the access control unit M1 prohibits updating of data in the RO area by executing the program stored in the ROM. In addition, the access control unit M1 permits updating of data only once in the WO area, and when data is updated once, the access control unit M1 prohibits subsequent updating of data. Furthermore, the access control unit M1 prohibits updating of data although updating of data in the OW area is instructed by the communication unit 109, when the updated data value will violate the limit of data updating in the OW area.

As illustrated in FIG. 4, the RO area stores unique information specific to the individual cartridge 10 that does not have to be changed such as date of manufacture, serial number of the cartridge 10. Here, the attribute of such information that does not have to be changed denoted as an RO attribute.

The OW area stores use information relating to the use state of each member of the cartridge 10. The use information is information including a value that only increases or only decreases in accordance with the use of the cartridge 10, such as the remaining amount of toner the used amount of the photoconductor 1 or the developing roller 5 (e.g., evaluated by accumulated number of rotations or accumulated number of sheets P with images formed thereon). Here, the attribute of such information including a value that only increases or only decreases is denoted as an OW attribute.

The RW area stores information, which is similar to that of the OW area, i.e., use information. In the present embodiment, however, the RW area is an area used in recycling. In other words, although use information is a value that only increases or only decreases according to the use of the cartridge 10, it is necessary, when recycling, to update the value reversely to the updating at the time of use. Therefore, the present embodiment intends to use the use information of the OW area when using the cartridge 10 for the first time, and use the use information of the RW area instead of the OW area after recycle.

The WO area stores reuse identification information I. The initial value of the reuse identification information I is zero, and the information can be rewritten to a different value from zero only once. In the present embodiment, the reuse identification information I being zero indicates that the cartridge 10 is used for the first time (brand-new), whereas the reuse identification information I being a different value from zero indicates that the cartridge 10 is recycled (recycled item). It is assumed in the following description that the reuse identification information I indicating a recycled item is one.

The storage unit M2 is shipped with initial values illustrated in FIG. 4 stored in respective areas of the storage unit M2 at the time of production. It is assumed here that information relating to the initial value of the use information is known to the image forming apparatus 100. For example, it is assumed that the initial value of the use information is also stored in the RO area of the memory 108 or the storage unit M2.

Figure 5:
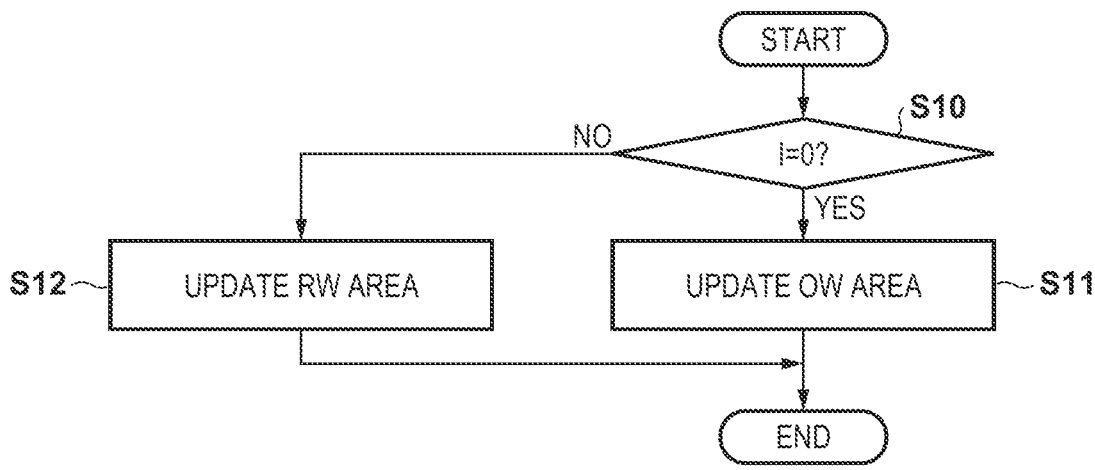
FIG. 5 is a flowchart of a use information update process according to an embodiment.

FIG. 5 is a flowchart of a process for updating the use information of the storage unit M2 in accordance with the change in the use state of each member of the cartridge 10. At S10, the CPU 104 reads the reuse identification information I from the storage unit M2 and determines whether or not the reuse identification information I is zero. When the reuse identification information I is zero, the cartridge 10 is brand-new and therefore the CPU 104 updates the use information of the OW area at S11. When, on the other hand, the reuse identification information I is one, the cartridge 10 is a recycled item and therefore the CPU 104 updates the use information of the RW area at S12. Here, the use information of the OW area or the RW area may be stored in the memory 108 and the use information of the memory 108 may be updated in accordance with the value of the reuse identification information, and the use information of the memory 108 may be written to the OW area or the RW area at an arbitrary timing.

Subsequently, an initialization process (referred to as reset process below) performed in order to use the recycled cartridge 10 in the image forming apparatus 100 will be described, referring to FIG. 6. The reset process is a process for updating the information stored in the storage unit M2 to an appropriate information when starting the use in the image forming apparatus 100. It is assumed in the present embodiment that the reset process is executed by the image forming apparatus 100. Specifically, when starting the use of the recycled cartridge 10 by attaching the recycled cartridge 10 to the main body 103 of the image forming apparatus 100, the user inputs a reset command to the image forming apparatus 100 by a user operation on the user IF 27. The CPU 104 starts the process illustrated in FIG. 6 in response to the reset command.

At S20, the CPU 104 reads the reuse identification information I from the storage unit M2 and determines whether or not the reuse identification information I is zero. The reuse identification information I being zero indicates that the cartridge is recycled for the first time. In this case, the CPU 104 determines at S21 whether or not the RW area is an initial value. Since the information of the RW area is not updated at the first-time use, the information of the RW area should remain at the initial value. Therefore, when the information of the RW area is not the initial value, the CPU 104 terminates the process illustrated in FIG. 6, determining that the information of the storage unit M2 may have some abnormality. On this occasion, the CPU 104 displays on the user IF 27 that the information of the storage device M may have some abnormality. When the information of the RW area is the initial value, the CPU 104 determines at S22 whether or not the information of the OW area is the initial value. The reuse identification information I being zero and the information of both the RW area and the OW area being the initial values implies that the cartridge 10 is not a recycled item and the cartridge 10 can be an unused brand-new item. Therefore, when the information of the OW area is the initial value at S22, the CPU 104 terminates the process illustrated in FIG. 6. On this occasion, the CPU 104 displays on the user IF 27 indicating that the cartridge 10 can be an unused brand-new item. When, on the other hand, the information of the OW area is not the initial value at S22, the CPU 104 updates the reuse identification information I to one at S23.

When the reuse identification information I is one at S20, the CPU 104 determines at S24 whether or not the information of the OW area is the initial value. The reuse identification information I being one implies that the cartridge 10 is used at least once in the image forming apparatus 100 as a recycled item. Therefore, the information of the OW area should be updated from the initial value. Therefore, when the information of the OW area is the initial value, the CPU 104 terminates the process illustrated in FIG. 6, determining that the information of the storage unit M2 may have some abnormality. On this occasion, the CPU 104 displays on the user IF 27 indicating that the information of the storage device M may have some abnormality. When the information of the OW area is not the initial value, the CPU 104 determines at S25 whether or not the information of the RW area is the initial value. The processing at S25 is performed on the cartridge 10 used in the image forming apparatus 100 at least once as a recycled item, and normally, the information of the RW area should have been changed from the initial value. Furthermore, members in the cartridge 10 are set to be in a reusable state, such as being refilled with toner by recycling. Therefore, when the information of the RW area is not the initial value, the CPU 104 sets the initial value to the RW area at S26 and terminates the process illustrated in FIG. 6. On this occasion, the CPU 104 displays indicating that the reset process is successfully completed, for example. When, on the other hand, the information of the RW area is the initial value, the CPU 104 terminates the process illustrated in FIG. 6, determining that the cartridge 10 has already been performed with the reset process. On this occasion, the CPU 104 displays on the user IF 27 indicating that the reset process has been performed, for example.

The reset process described above allows for appropriately setting the information stored in the storage unit M2 of the recycled cartridge 10. Here, the process illustrated in FIG. 6 is merely an example, and it may be configured to skip one or more of the steps S21, S22, S24 and S25.

<Modification Form>

It is assumed in the aforementioned embodiment that the image forming apparatus 100 performs the reset process. In this case, the reset process is performed when the user of the image forming apparatus 100 starts using the recycled cartridge 10. However, it is also preferable that a recycling company performs the reset process, sparing the necessity of performing the reset process by the user of the image forming apparatus 100. Therefore, it may be configured to use a dedicated processing apparatus in place of the image forming apparatus 100.

Figure 6:
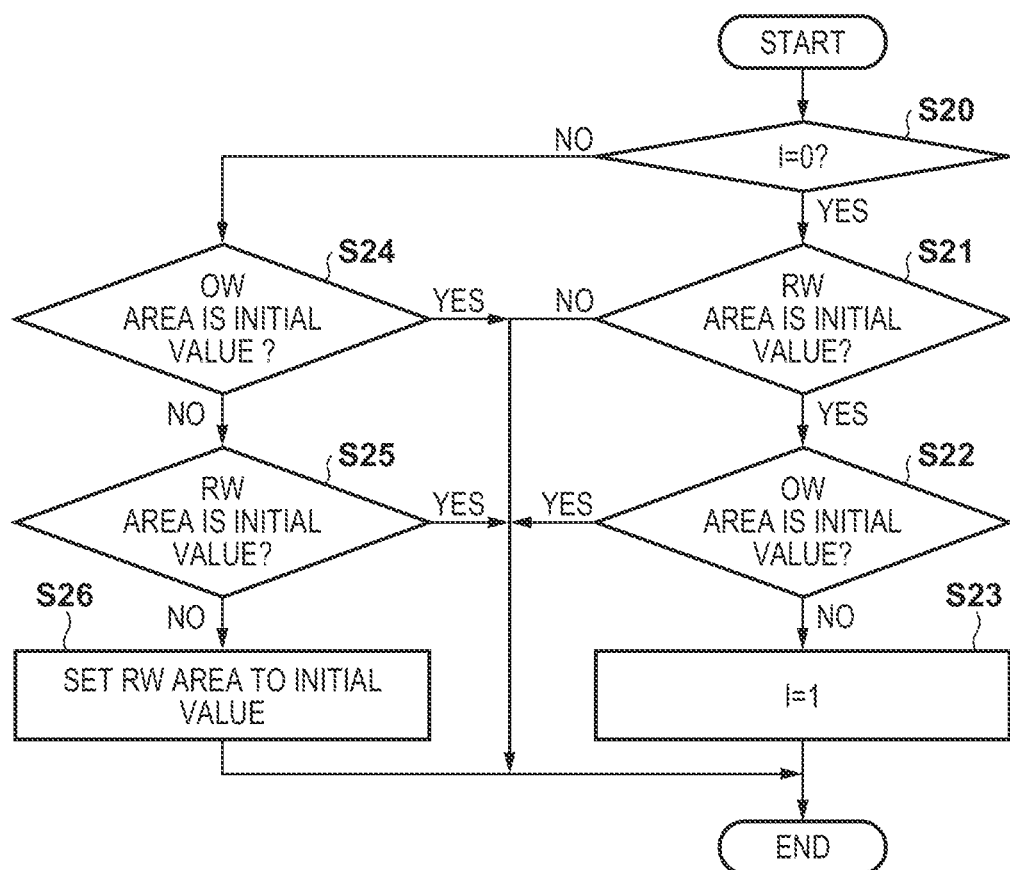
FIG. 6 is a flowchart of a reset process according to an embodiment.
Figure 7A:
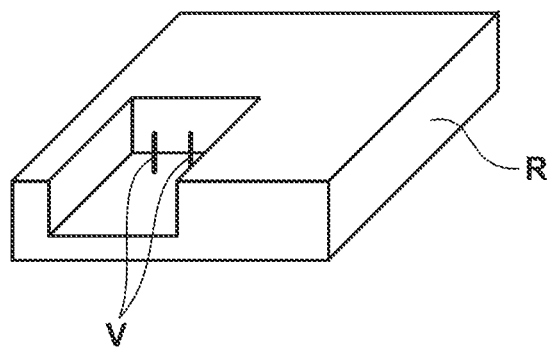
FIGS. 7A and 7B are explanatory diagrams of a processing apparatus that performs the reset process according to an embodiment.
Figure 7B:
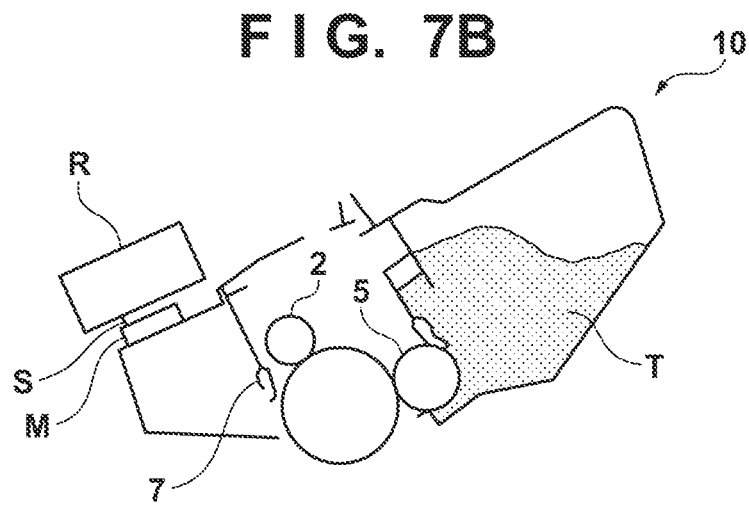

As illustrated in FIG. 7A, the processing apparatus R includes contacts V corresponding to each contact S of the storage device M. As illustrated in FIG. 7B, the contact V of the reset processing apparatus R is electrically connected to the corresponding contact S of the storage device M. The reset processing apparatus R then performs the reset process according to the flowchart of FIG. 6 via the electrical connection.

Second Embodiment

Next, a second embodiment will be explained mainly on differences from the first embodiment. In the first embodiment, the use information stored in the OW area is updated when the reuse identification information I is zero, whereas the use information stored in the RW area is updated when the reuse identification information I is not zero. In addition, all the use information of the RW area is set to the initial value in the reset process. This is based on the assumption that the state of each member of the cartridge 10 is maintained/refilled to a state corresponding to the initial value owing to recycling. However, the lifetime of each member of the cartridge 10 may differ for each member. Therefore, for example, it may be the case that the first recycling performs only toner refilling, and does not perform maintenance of the photoconductor 1 and the developing roller 5, and the second recycling performs toner refilling and maintenance of the photoconductor 1 and does not perform maintenance of the developing roller 5. In such a case, not all pieces of the use information of the RW area can be set to the initial value in the reset process, and for some members, despite being recycled items, it may be obliged to use the use information of the WO area. The present embodiment is configured to facilitate an appropriate management of the use information even when not all the members whose use information is being managed receive refilling or maintenance by recycling.

FIG. 8 is an explanatory diagram of the storage area of the storage unit M2 according to the present embodiment. In the present embodiment, the use information stored in the OW area and the RW area includes the remaining amount of toner T1, the used amount of the photoconductor D1, D2, and the used amount of the developing roller G1. G2. The remaining amount of toner T1 is information whose value decreases with use. In contrast, the used amount of the photoconductor 1 and the used amount of the developing roller 5 are information whose value increases with use. As such, the OW area may have mixed together therein a plurality of types of use information whose value either increases or decreases with use. Here, the used amount of the photoconductor D1, G2 and the used amount of the developing roller G1, G2 is represented as a proportion relative to the upper limit of used amount set as the lifetime. However, other evaluation values may be used, such as the number of sheets subjected to image formation, or the total number of rotations. In the present embodiment, the reuse identification information is provided in association with each piece of the use information. Specifically, the reuse identification information I1 corresponds to the remaining amount of toner, the reuse identification information I2 corresponds to the used amount of the photoconductor 1, and the reuse identification information I3 corresponds to the used amount of the developing roller 5. In addition, the present embodiment manages a reuse counter C as information of the OW attribute.

When the reuse identification information I1 is zero, the CPU 104 updates the OW area in terms of the remaining amount of toner T1, or updates the RW area in terms of the remaining amount of toner T1 when the reuse identification information I1 is one. In addition, the CPU 104 updates the OW area in terms of the used amount of the photoconductor D1, D2 when the reuse identification information I2 is zero, or updates the RW area in terms of the used amount of the photoconductor D1, D2 when the reuse identification information I2 is one. Furthermore, the CPU 104 updates the OW area in terms of the used amount of the developing roller G1, G2 when the reuse identification information I3 is zero, or updates the RW area in terms of the used amount of the developing roller G1, G2 when the reuse identification information I3 is one.

The reset process according to the present embodiment is basically similar to that of the first embodiment except for specifying a member to be processed. For example, when only refilling of toner performed by recycling, the user inputs a reset command, which specifies process target to be the toner, to the image forming apparatus 100 via the user IF 27. In this case, the reuse identification information I in the process illustrated in FIG. 6 is the reuse identification information I1, and the RW area and the OW area are the remaining amount of toner in the RW area and the remaining amount of toner in the OW area, respectively. In addition, when refilling of toner and maintenance of the photoconductor 1 are performed by recycling, the user inputs a reset command, which specifies process target to be the toner and the photoconductor 1, to the image forming apparatus 100. In this case, the CPU 104 performs the process illustrated in FIG. 6 making the process target to be the toner, and the process illustrated in FIG. 6 making the process target to be the photoconductor 1, respectively. When the photoconductor 1 is the process target, the reuse identification information I in the process illustrated in FIG. 6 is the reuse identification information I2, and the RW area and the OW area is the used amount of the photoconductor 1 in the RW area and the used amount of the photoconductor 1 in the OW area, respectively. Here, the CPU 104 records the number of times the reset command is input (number of times the reset process is performed) as the reuse counter C.

The aforementioned configuration allows for appropriately setting the information stored in the storage unit M2 of the cartridge 10, even when not all the members whose use information is being managed receive refilling or maintenance by recycling. In addition, the number of times recycled can be managed by the reuse counter C. Here, management of the reuse counter C may be applied to the configuration of the first embodiment.

Third Embodiment

Subsequently, a third embodiment will be described, focusing on the difference from the aforementioned embodiments. FIG. 9 is a flowchart of a reset process according to the present embodiment. Here, process steps similar to those in the flowchart of the first embodiment illustrated in FIG. 6 are provided with same step numbers and descriptions thereof will be omitted.

When, in the present embodiment, the OW area is not the initial value at S22, it is determined at S30 whether or not the value of the remaining amount of toner stored in the OW area is below a threshold value. An amount of toner equal to or larger than the threshold value being left indicates a possibility that the reset command may have been erroneously input in a state where a brand-new cartridge 10 is attached to the main body 103. Therefore, in this case, the CPU 104 determines at S32 to display on the user IF 27 indicating that an amount of toner is left, and display prompting the user to input whether or not to continue the reset process. When the user inputs termination of the reset process in response to the display, the CPU 104 terminates the process illustrated in FIG. 9 without performing the processing at S23. When, on the other hand, the user inputs continuation of the reset process, the CPU 104 updates the reuse identification information I at S23.

Similarly, when the RW area is not the initial value at S25, the CPU 104 determines at S31 whether or not the remaining amount of toner stored in the RW area is lower than the threshold value. When an amount of toner equal to or larger than the threshold value is left, the reset command may have been erroneously input, and therefore the CPU 104 displays on the user IF 27 at S32 indicating that an amount of toner is left and prompts the user to input whether or not to continue the reset process. When the user inputs termination of the reset process, the CPU 104 terminates the process illustrated in FIG. 9 without performing the processing at S26. When, on the other hand, the user inputs continuation of the reset process, the CPU 104 sets the RW area to the initial value at S26.

As such, when it is determined based on the value of the use information that there is a possibility that the reset command has been input by misoperation, the user is notified of the possibility of misoperation and prompted to input whether or not to continue the reset process. According to the aforementioned configuration, it is possible to prevent updating the information of the storage device M by misoperation. At S32, the value of the use information, and specifically the value of the remaining amount of toner in the present example can be displayed. Here, the use information used for determining the possibility of misoperation is not limited to the remaining amount of toner. The use information indicates the use state of members, and thus it may be configured to notify the user of the possibility of misoperation and prompt the user to input whether or not to continue the reset process, when there is a piece of use information indicating less progress. Accordingly, the present embodiment may be applied to the configuration of the second embodiment. When performing a reset process of the photoconductor 1, for example, it may be configured to notify the user of the possibility of misoperation and prompt the user to input whether or not to continue the reset process when the used amount of the photoconductor 1 is lower than the threshold value. Furthermore, in order to suppress misoperation, it may be configured to invariably execute the processing at S32 to inquire of the user whether or not to continue the reset process.

Fourth Embodiment

Subsequently, a fourth embodiment will be described, focusing on the difference from the aforementioned embodiments. The present embodiment allows, after performing the reset process, the value of the use information of the RW area of the storage device M to be restored to the value before resetting.

Figure 10:
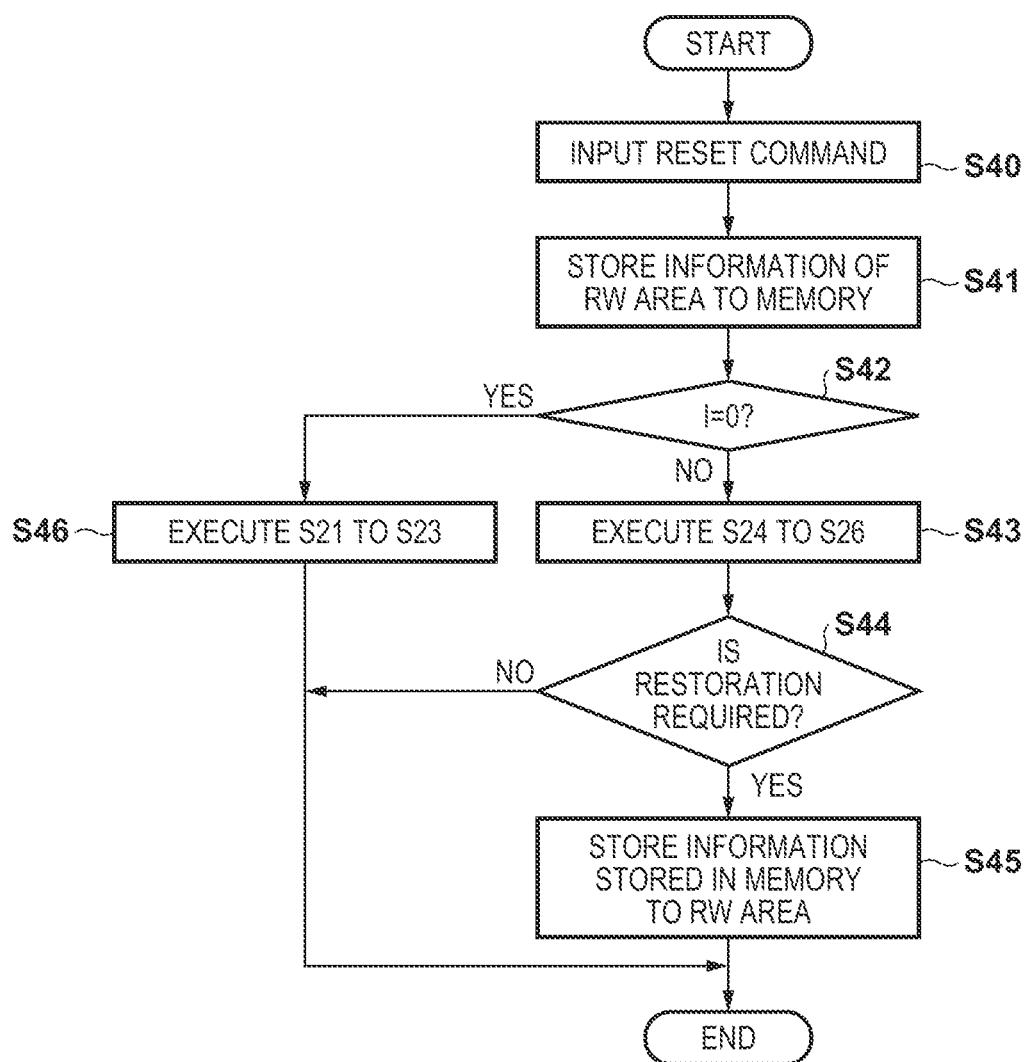
FIG. 10 is a flowchart of a reset process according to an embodiment.

FIG. 10 is a flowchart of the reset process according to the present embodiment. When a reset command is input at S40, the CPU 104 stores at S41 the use information stored in the RW area into the memory 108 of the engine control unit 102. At S42, the CPU 104 determines whether or not the reuse identification information I is zero. When the reuse identification information I is zero, the CPU 104 performs at S46 the processing from S21 to S23 of FIG. 6 and terminates the process illustrated in FIG. 10. When, on the other hand, the reuse identification information I is one, the CPU 104 performs at S43 the processing from S24 to S26 of FIG. 6. Subsequently, at S44, the CPU displays on the user IF 27 prompting to input whether or not to restore the information of the storage device M. Upon the user instructing to restore the information of the storage device M, the CPU 104 stores at S45 the use information stored in the memory 108 into the RW area of the storage unit M2. When, on the other hand, the user does not instruct to restore the information of the storage device M, the CPU 104 deletes the information stored in the memory 108 and terminates the process illustrated in FIG. 10.

Here, it may be configured such that when the reuse identification information I is zero at S42, the CPU 104 performs the processing at S21 and S22 in FIG. 6 and displays on the user IF 27 prompting to input whether or not to restore the information of the storage device M before performing the processing at S23. In this case, when the user does not instruct to restore the information of the storage device M, the CPU 104 performs the processing at S23 in FIG. 6, i.e., a process for changing the reuse identification information I to one. When, on the other hand, the user instructs to restore the information of the storage device M, the CPU 104 terminates the process illustrated in FIG. 10 skipping the processing at S23 of FIG. 6, i.e., without updating the reuse identification information I.

Fifth Embodiment

Figure 11:
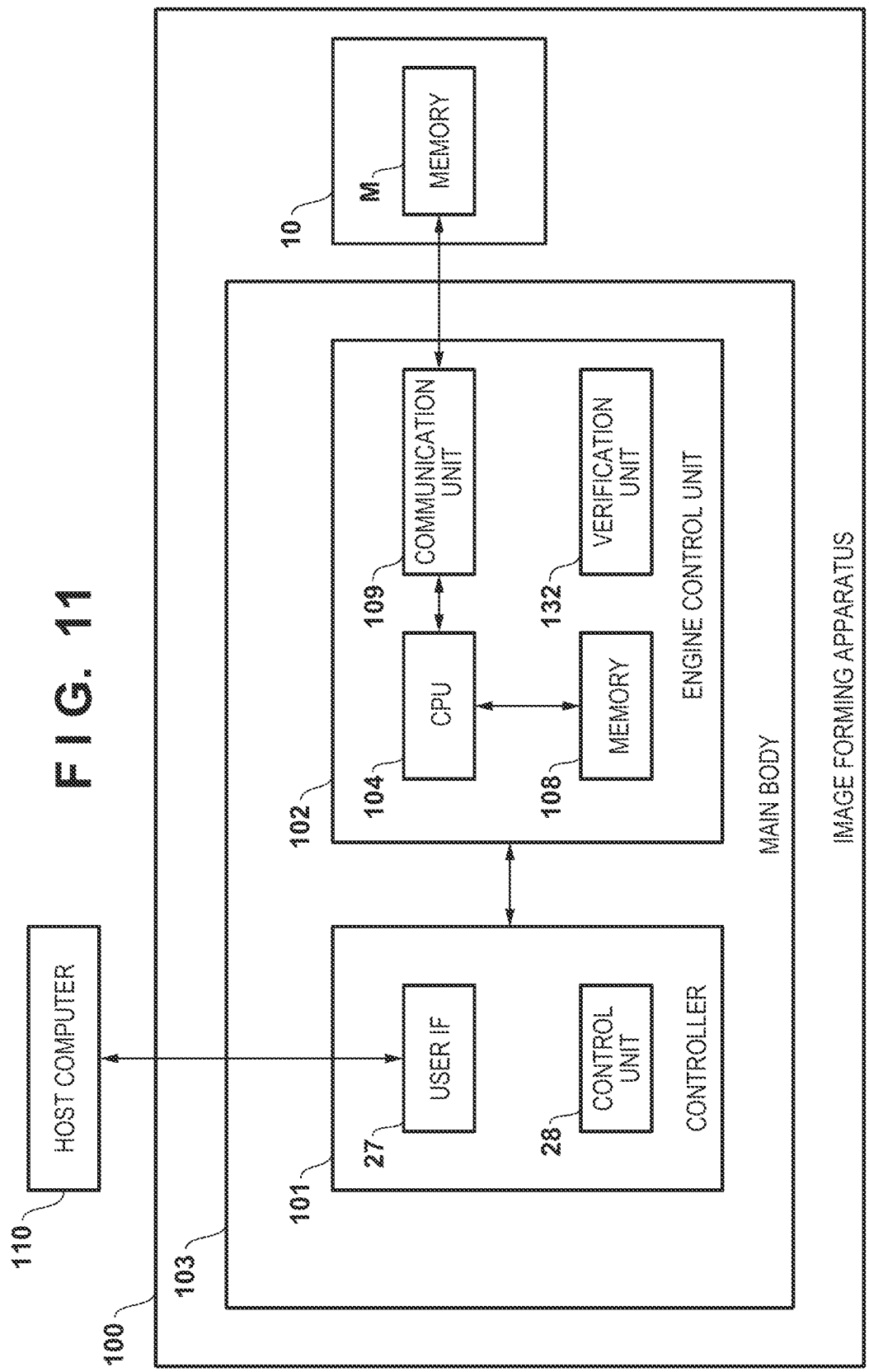
FIG. 11 is a functional block diagram of an image forming apparatus according to an embodiment.

Subsequently, a fifth embodiment will be described, focusing on the difference from the aforementioned embodiments. The present embodiment protects the use information to be stored in the OW area using verification information such as a Message Authentication Code (MAC), for example, which can verify the validity of the use information, i.e., untampered. Therefore, in addition to the use information, a MAC corresponding to the use information is stored in the storage device M in association with the use information. Here, the area in which the MAC is stored is the RW area. FIG. 11 is a control configuration diagram of the image forming apparatus according to the present embodiment. The difference from the configuration illustrated in FIG. 2 is a verification unit 132 provided in the engine control unit 102. The verification unit 132 has a key for generating and verifying a MAC. The key is generated by a predetermined algorithm based on unique information stored in the RO area of the storage unit M2, specifically the date of manufacture and the serial number in the case of the present embodiment.

When updating the use information of the OW area, the CPU 104 reads use information before updating together with the MAC of the use information, and causes the verification unit 132 to verify the use information. The verification unit 132 verifies the MAC using the use information and the key held therein, and notifies the CPU 104 of whether the verification succeeded or failed. When the verification has succeeded, the CPU 104 notifies the verification unit 132 of the updated use information, and receives a MAC corresponding to the updated use information from the verification unit 132. The CPU 104 then records the updated use information in the OW area, and records the corresponding MAC in the RW area. When, on the other hand, the verification has failed, the CPU 104 notifies the user IF 27 of the verification error.

Figure 12:
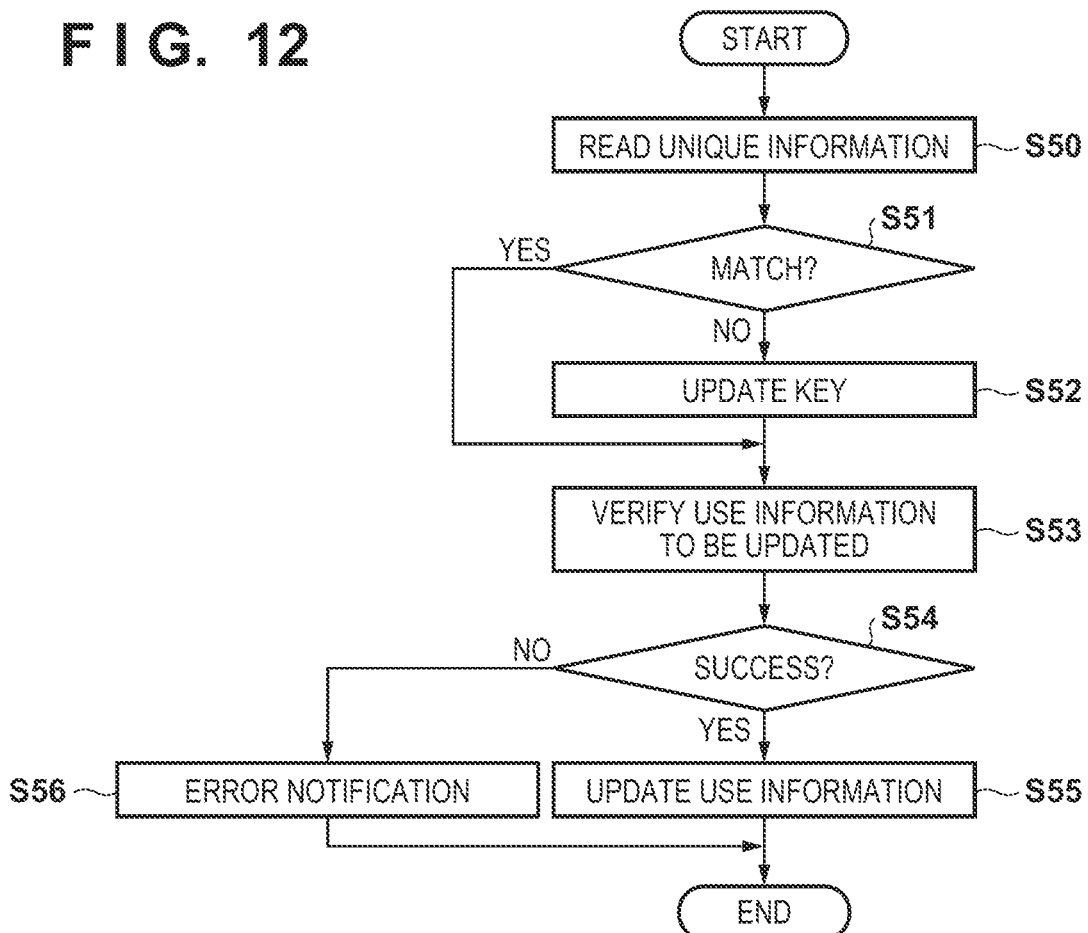
FIG. 12 is a flowchart of a use information update process according to an embodiment.

The present embodiment performs, at S11 of FIG. 5, the process illustrated in FIG. 12 when updating the use information of the OW area of the storage device M in accordance with the use of the cartridge 10. First, the CPU 104 reads the unique information from the RO area at S50, and determines at S51 whether or not it matches the unique information stored in the memory 108. In a case of a mismatch, the CPU 104 notifies the verification unit 132 of the unique information read from the RO area, and causes the verification unit 132 to generate a key for the attached cartridge 10. Furthermore, the CPU 104 updates the unique information to be stored in the memory 108 to the unique information read from the RO area. When, on the other hand, the unique information read from the RO area matches the unique information stored in the memory 108, the verification unit 132 has already generated and is holding the key for the attached cartridge 10 and therefore the processing at S52 is skipped. At S53, the CPU 104 reads the use information to be updated, together with the MAC of the use information, causes the verification unit 132 to verify them, and receives the verification result from the verification unit 132 at S54. When the verification has succeeded, the CPU 104 updates at S55 the use information of the OW area and the MAC as described above. Here, the MAC corresponding to the updated use information is generated by the verification unit 132. When, on the other hand, the verification has not succeeded, the CPU 104 displays the verification error on the user IF 27 at S56 as described above.

Adding the verification information to the use information to be stored in the OW area limits the apparatus that can update the use information of the OW area to an apparatus having the same function as the verification unit 132. The aforementioned configuration can ensure that updating of the use information conforms to the OW attribute. Although the MAC is used as the verification information in the present embodiment, any type of verification information that can detect tampering of the use information can be used.

Although the MAC has been applied to the OW area in the present embodiment, it may be configured to apply the MAC also to at least one, or both, of the RO area and the WO area. For example, the storage device M described in the first to the fourth embodiments includes the access control unit M1, and the update limit of the data according to the attribute of each area of the storage unit M2 is realized by the access control unit M1. However, there may arise, for example, a case where the access control unit M1 is lacking and the communication unit 109 directly writes and reads data to and from the storage unit M2. In this case, the limit on data updating for each area of the storage unit M2 is realized by a function of the image forming apparatus 100. In other words, the storage device M itself loses the function of limiting updating of the data in accordance with the attribute of each area of the storage unit M2. However, by protecting, using the MAC, an area other than the RW area, i.e., an area without any limit on data updating, the apparatus that can update the information of the area is limited to the apparatus having the same function as the verification unit 132. Such a configuration can ensure that the information of the area conforms to the limit of data updating in the area.

Sixth Embodiment

For example, performing the reset process by a misoperation while using a brand-new cartridge 10 may cause the cartridge 10 being recognized as a recycled item by the image forming apparatus 100. In addition, although the use information of the RW area is used instead of the use information of the OW area after the reset process, the use information of the RW area does not indicate the actual use state of the currently used member, whereby difference between the use state indicated by the use information and the actual use state occurs. Similarly, performing the reset process by a misoperation while using a recycled cartridge 10 causes initialization of the use information, whereby a difference between the use state indicated by the use information and the actual use state occurs. Therefore, it is preferable to provide some type of limit on execution of the reset process. The present embodiment stores, in the memory 108, execution permission information indicating whether or not execution of the reset process is permitted. When the reset command is input, the CPU 104 determines whether or not the execution permission information indicates that execution of the reset process is permitted. The CPU 104 then executes the reset process when the execution permission information indicates that execution is permitted, whereas the CPU 104 displays on the user IF 27 indicating that the reset process is not permitted and does not execute the reset process when the execution permission information indicates that execution is prohibited. The initial value of the execution permission information is "execution prohibited".

In the following, there will be described a process according to the present embodiment for changing the execution permission information to "execution permitted". First, the memory 108 of the image forming apparatus 100 has a public key stored therein. A server apparatus on the network has preliminarily stored therein reset information of the image forming apparatus 100 and a digital signature of the reset information, for the image forming apparatus 100 to which permission of the reset process is given. Here, the reset information of the image forming apparatus 100 includes identification information such as the serial number of the image forming apparatus 100. In addition, the digital signature is generated using a private key paired with the public key stored in the memory of the image forming apparatus 100.

The server apparatus may either be connected to a network within an organization possessing the image forming apparatus 100, or connected to the Internet. In addition, the reset information and the digital signature of the reset information are generated and provided, for example, by a manufacturer of the image forming apparatus 100 in response to a request from the organization possessing the image forming apparatus 100.

Figure 13:
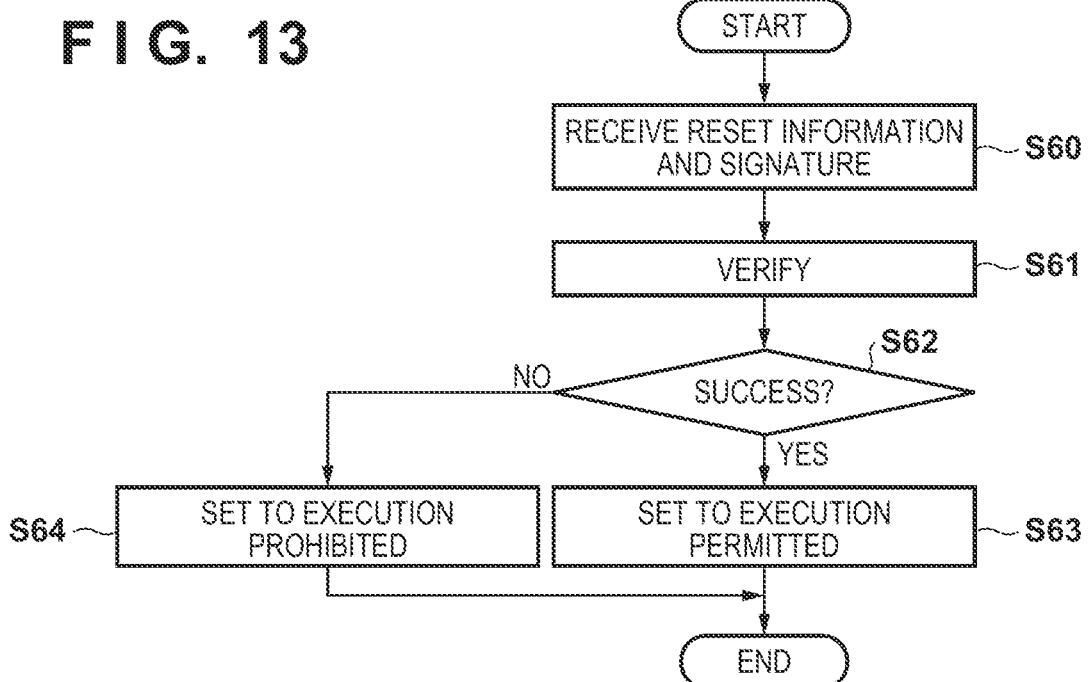
FIG. 13 is a flowchart of a process that allows the image forming apparatus to execute the reset process according to an embodiment.

FIG. 13 is a flowchart of a process for changing the execution permission information to "reset permitted". Among the users of the image forming apparatus 100, a user who has an access right to the aforementioned server apparatus (specified user, in the following) acquires the reset information and the digital signature of the reset information using the host computer 110 and transmits them to the image forming apparatus 100 at S60.

The CPU 104 verifies at S61 whether or not the reset information is tampered, based on the public key and the digital signature stored in the memory 108. In addition, the CPU 104 determines whether or not the identification information stored in the reset information matches the own identification information of the image forming apparatus 100 itself. When the reset information has not been tampered, and the identification information stored in the reset information matches the own identification information of the image forming apparatus 100 itself, the CPU 104 determines at S62 that verification has succeeded, or otherwise determines that verification has failed. When verification has succeeded, the CPU 104 changes the execution permission information "execution permitted" at S63. When, on the other hand, verification has failed, the CPU 104 keeps the execution permission information "execution prohibited" at S64. The specified user can cause the image forming apparatus 100 to execute the reset process after having changed the execution permission information to "execution permitted".

It may be configured such that when the execution permission information is set to "execution permitted", the information indicating permission of execution is maintained until an instruction switching to "execution prohibited" is input from the specific user. In addition, it may be configured to automatically change the execution permission information to "execution prohibited" after execution of the reset process, when the specified user executed the reset process.

The aforementioned configuration thus allows for preventing performing the reset process by misoperation. Here, verification of the validity of the reset information is not limited to using a digital signature, and other verification methods, which can verify that the reset information is generated by the manufacturer of the image forming apparatus 100, may be used. Although it is assumed in the present embodiment that the public key is stored in the image forming apparatus, and the digital signature is generated using the private key, the private key may be stored in the image forming apparatus and the digital signature may be generated using the public key.

Other Embodiments

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-140266, filed Aug. 30, 2021, which is hereby incorporated by reference herein in its entirety.

What is claimed is:

1. A processing apparatus configured to perform a predetermined process on a component unit configured to be attachable to and detachable from a main body of an image forming apparatus, the processing apparatus comprising:
   an external contact configured to transmit and receive data to and from a storage device of the component unit;
   a control unit configured to read and update information stored in the storage device via the external contact; and
   a reception unit configured to receive a user operation,
   wherein the storage device includes a first area and a second area configured to store use information indicating a use state of the component unit, and a third area configured to store reuse identification information indicating whether or not the component unit is a recycled item, and
   wherein the control unit, in response to the user operation instructing execution of a predetermined process, reads the reuse identification information from the storage device, and updates the reuse identification information to a second value indicating the recycled item when the reuse identification information is a first value indicating not the recycled item, or updates the use information stored in the second area to a predetermined initial value when the reuse identification information is the second value.

2. A component unit configured to be attachable to and detachable from a main body of an image forming apparatus, the component unit comprising:
   one or more members; and
   a storage unit configured to store information about the component unit,
   wherein the storage unit includes a first area and a second area configured to have mutually different limits on updating of the information,
   wherein the storage unit further includes a third area configured to have a limit on updating of the information differing from that of the first area and the second area, and wherein the third area is configured to permit updating of the information only once.

3. The component unit according to claim 2, wherein the first area is configured to permit updating only to increase or decrease a value indicated by the information, and
wherein the second area is configured to permit updating to increase and decrease a value indicated by the information.

4. The component unit according to claim 3, wherein the first area is configured to store a plurality of pieces of information about the component unit, and to allow for differentiating whether to increase or decrease values indicated by the plurality of pieces of information, depending on each of the plurality of pieces of information.

5. The component unit according to claim 2, wherein the storage unit further includes a fourth area configured to have a limit differing from that of the first, the second, and the third areas.

6. The component unit according to claim 5, wherein the fourth area is configured to prohibit updating of the information.

7. The component unit according to claim 5, wherein the fourth area is an area configured to store unique information of the component unit.

8. The component unit according to claim 2, wherein the first area and the second area are areas configured to store use information indicating a use state of at least one member among the one or more members.

9. The component unit according to claim 8, wherein the use information stored in the first area and the second area indicates a use state of a same member.

10. The component unit according to claim 8, wherein the one or more members include a photoconductor, an exposure apparatus configured to expose the photoconductor, and a developing apparatus configured to develop, with toner, an electrostatic latent image formed on the photoconductor, and
wherein the use information indicating a use state of the at least one member includes at least one of a used amount of the photoconductor, a used amount of the exposure apparatus, and a remaining amount of the toner.

11. The component unit according to claim 2, wherein the one or more members include a first member and a second member,
wherein the first area and the second area store first use information indicating a use state of the first member and second use information indicating a use state of the second member, and
wherein the third area stores first information indicating whether or not the first member is a recycled item, and second information indicating whether or not the second member is a recycled item.

12. A component unit configured to be attachable to and detachable from a main body of an image forming apparatus, the component unit comprising:
one or more members; and
a storage unit configured to store information about the component unit,
wherein the storage unit includes a first area and a second area configured to have mutually different limits on updating of the information,
wherein the storage unit further includes a third area configured to have a limit on updating of the information differing from that of the first area and the second area, and
wherein the third area is an area configured to store information indicating whether or not the component unit is a recycled item.

* * * * *